(12) United States Patent
Evensen et al.

(10) Patent No.: US 7,054,615 B2
(45) Date of Patent: May 30, 2006

(54) SYSTEM AND METHOD FOR PROVIDING ENHANCED USER PRIVACY IN A MOBILE COMMUNICATIONS NETWORK

(75) Inventors: Thommy Evensen, Froland (NO); Iovieno Maurizio, Mercato San Severino (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 435 days.

(21) Appl. No.: 10/358,417

(22) Filed: Feb. 4, 2003

(65) Prior Publication Data

US 2003/0153332 A1   Aug. 14, 2003

(30) Foreign Application Priority Data

Feb. 13, 2002   (NO)   .................................. 20020724

(51) Int. Cl.
*H04M 1/66*   (2006.01)
(52) U.S. Cl. ..................... 455/411; 455/410; 455/456.2
(58) Field of Classification Search ............. 455/456.1, 455/410, 411, 414.1, 435, 456.2, 456.5
See application file for complete search history.

(56) References Cited

U.S. PATENT DOCUMENTS

| | | | |
|---|---|---|---|
| 5,440,541 A * | 8/1995 | Iida et al. | 370/352 |
| 5,940,756 A * | 8/1999 | Sibecas et al. | 455/426.1 |
| 5,963,866 A * | 10/1999 | Palamara et al. | 455/456.5 |
| 6,259,900 B1 * | 7/2001 | Terashima | 455/126 |
| 6,442,391 B1 * | 8/2002 | Johansson et al. | 455/456.2 |
| 2002/0094777 A1 * | 7/2002 | Cannon et al. | 455/41 |
| 2003/0148771 A1 * | 8/2003 | de Verteuil | 455/456 |

OTHER PUBLICATIONS

ETSI TS 123 271 V4.4.0 (Dec. 2000) Technical Specification; Digital Cellular Telecommunications Systems (Phase 2+)(GSM); Universal Mobile Telecommunications System (UMTS); Functional Stage 2 Description of Location Services (3GPP TS 23.271 Version 4.4.0 Release 4).

3GPP TR 23.871 V1.0.0 (Dec. 2001) Technical Report; 3$^{rd}$ Generation Partnership Project; Technical Specification Group Services and System Aspects; Technical Report Enhanced Support for User Privacy in Location Services (Release 5).

3GPP TS 22.071 V3.3.0 (Oct. 2000) Technical Specification; 3$^{rd}$ Generation Partnership Project; Technical Specification Group Services and System Aspects; Location Services (LCS); Service Description, Stage 1 (Release 1999).

* cited by examiner

*Primary Examiner*—Congvan Tran

(57) ABSTRACT

A system and method in a mobile communication network for providing enhanced user privacy when responding to a location request from a client requesting location information for a mobile terminal. The system includes a mobile location node, a service node serving the mobile terminal, and a home location register/home subscriber server (HLR/HSS) associated with the mobile terminal. A list of approved codewords and a list of approved service types are stored in the HLR/HSS, and only location requests that include approved codewords or service types from these lists are accepted by the system. The mobile location node may also store a list of approved service identities, and may reject location requests that do not include a service identity matching one of the approved service identities. A mapping function in the mobile location node maps service identities to service types and sends them to the HLR/HSS or to the service node for comparison with approved service types.

14 Claims, 3 Drawing Sheets

SYSTEM AND METHOD FOR PROVIDING ENHANCED USER PRIVACY IN A MOBILE COMMUNICATIONS NETWORK

CROSS-REFERENCE TO RELATED APPLICATIONS

This application claims the benefit of the filing date as provided by 35 U.S.C. § 119 of Norweigian patent application number 20020724 filed on Feb. 13, 2002, the disclosure of which is incorporated herein by reference.

BACKGROUND OF THE INVENTION

The present invention is related to wireless telecommunication systems. More particularly, and not by way of limitation, the present invention is directed to a system and method for providing enhanced user privacy when utilizing Location Services (LCS) in mobile telephone networks.

The present invention, and the current state of the art, are described herein in terms of the General Packet Radio Service (GPRS). Terminology and abbreviations within the technical field of GPRS, well known for persons skilled in the art, are utilized in this application. The Third Generation Partnership Project (3GPP) Technical Specification (TS) 23.271 is hereby incorporated by reference herein, and provides a detailed description of LCS in GPRS networks.

Higher data speeds in wireless telecommunication systems enable operators to offer new types of services. One such service type is LCS, which are services providing mobile telephone users with information about the location of objects or persons. This information may be presented on the user terminal, for example, on a digital map, or as an audio or text message indicating a position, address, or place name.

Further, LCS services may be considered as a network-provided enabling technology consisting of standardized service capabilities, which enable the provision of location-based applications. The main network component for providing LCS services is the GMLC (Gateway Mobile Location Center), to which all location requests are transmitted, and which, in return, provides the requested location from the mobile network. The application(s) may be service-provider specific, for example tracking of persons or vehicles. However, the description of the numerous and varied possible location applications that are enabled by this technology are outside the scope of the present application.

There is a need to enhance the privacy mechanisms provided for LCS services to support the increasing number of LCS clients and the varying privacy requirements for location services. It is also desirable for the subscriber to have the capability to set or change the location-related privacy parameters in the subscriber's home network. Current LCS specifications in 3GPP are limited in regards to user privacy, and in particular there is a need to enhance the privacy mechanisms, for example, for roaming subscribers. In the current specifications, only limited screening for privacy is possible. The screening is based on the "LCS client ID" parameter of the Provide Subscribe Location message utilized in the Mobile Application Part (MAP) protocol. The Provide Subscribe Location message is utilized by the GMLC to request the subscriber's location from the Serving GPRS Support Node (SGSN) or Mobile Switching Center (MSC). The SGSN or MSC maps the received LCS client ID parameter to the subscriber's recorded privacy parameters (e.g., list of allowed LCS clients) to screen out any unwelcome location requests. In practice, there is a need to have a more detailed service-type screening, for example, to differentiate between a "Where am I" type of service and games or entertainment services.

Additionally, it is difficult for a subscriber to use local location-based services when roaming. The subscriber does not have proper means to add local LCS clients to the allowed LCS client list in the home environment Home Location Register (HLR). Furthermore, the privacy parameters are defined with a quite narrow scope in the HLR, which may make it difficult for the subscriber to set additional and varying privacy parameters for each LCS client. According to the current specifications, the subscriber cannot receive any information regarding who originally asked for the location of the subscriber. It would be desirable for the subscriber to be notified of the identity of the requestor. It would also be desirable for the location information to be given only to those requestors who are entitled to have it. In order to protect the UE (User Equipment) against unwelcome location requests, LCS services should support a screening function that denies the unwelcome accesses to the UE. The current LCS specification, however, only supports the screening mechanism using the external identity of the LCS client. Thus, there is a need to enhance the screening mechanism.

The most recent 3GPP Technical Report (TR) addressing this subject is 3GPP TR 23.871, version 1.1.0, which is hereby incorporated by reference herein. TR 23.871 identifies and describes the service requirements for user privacy in LCS services, and the corresponding functional requirements have been created, and some alternatives for possible solutions are introduced. The first part of TR 23.871 describes the corresponding stage 1 type of service requirements, and may be moved to the LCS Stage 1 specification TS 22.071. Stage 1 includes a set of requirements that shall be supported for the provision of user privacy in location services, seen primarily from the subscriber's and service providers' points of view. The TR describes some possible enhancements to the privacy mechanisms provided for LCS services to support the increasing number of LCS clients and the varying privacy requirements for location services. The second part of TR 23.871 describes the Stage 2 type of functional requirements for enhancing user privacy in location services, and may be moved to the LCS Stage 2 specification TS 23.271.

TR 23.871 presents four different proposed solutions on how to provide enhanced privacy checking.

1) Enhanced privacy handled in a new network node that is connected to the GMLC with a new interface.
2) Enhanced privacy handled in a new network node that is connected to the SGSN/MSC with a new interface.
3) Enhanced privacy handled in a GMLC located in the subscriber's home Public Land Mobile Network (HPLMN) that is connected to a GMLC in a Visited PLMN (VPLMN).
4) Enhanced privacy handled in a new network node that is connected to the subscribers Home Subscriber Server (HSS) with a new interface.

A major problem with the existing alternative solutions proposed in TR 23.871 is that they all require changes in the existing architecture, i.e., new interfaces and/or new network nodes. Changing the existing architecture would have high costs for both manufacturers and operators who already use the current agreed architecture. Moreover, several problems affecting new architectures have been identified, as reported in the TR.

BRIEF SUMMARY OF THE INVENTION

The present invention provides a solution for providing enhanced user privacy for LCS services based on the existing network architecture. In an exemplary embodiment, the invention is implemented in a GPRS/Global System for Mobile Communications (GSM) network. The functionality of existing nodes such as the GMLC, HLR/HSS, SGSN, and MSC is extended, and a few changes in signaling are implemented, to provide enhanced user privacy. Although the invention is described for exemplary purposes in the context of GPRS/GSM, the invention may also be practiced in other similar packet-switched or circuit-switched mobile telephone networks.

Thus, in one aspect, the present invention is directed to a system in a mobile communication network for providing enhanced user privacy when responding to a location request from a client requesting location information for a mobile terminal. The mobile network includes a service node serving the mobile terminal and a home location register/home subscriber server (HLR/HSS) associated with the mobile terminal. The location request includes an identifier for the requesting client, a codeword, and a service identity. The system includes a mobile location node that receives the location request from the client, requests routing information from the HLR/HSS, and forwards the location request to the service node; and a list stored in the HLR/HSS of approved codewords associated with the mobile terminal. The codeword included in the location request must match a codeword from the codeword list for the location request to be accepted. Additionally, the mobile location node may include a list of approved service identities associated with the client, and the service identity included in the location request must also match a service identity from the service identity list for the location request to be accepted. In another embodiment, the mobile location node may include a mapping function for mapping the service identity received in the location request to a service type. The mobile location node then sends a mapped service type to the HLR/HSS when requesting routing information. The HLR/HSS includes a list of approved service types associated with the mobile terminal, and the mapped service type must match a service type from the service type list in the HLR/HSS for the location request to be accepted.

In another aspect, the present invention is directed to a method in a mobile communication network of providing enhanced user privacy when responding to a location request from a client requesting location information for a mobile terminal. The mobile network includes a mobile location node, a service node serving the mobile terminal, and an HLR/HSS associated with the mobile terminal. The method begins when the location request from the client is received by the mobile location node. The location request includes an identifier for the requesting client, a codeword, and a service identity. This is followed by sending from the mobile location node to the HLR/HSS a request for routing information that includes the codeword from the location request. The codeword is then compared with a list in the HLR/HSS of approved codewords associated with the mobile terminal. The location request is then accepted only if the codeword included in the location request matches a codeword from the codeword list. The mobile location node may also include a list of approved service identities associated with the client, and the method may further comprise the steps of comparing the service identity included in the location request with the list of approved service identities; and accepting the location request if the service identity included in the location request matches a service identity from the list of approved service identities. In another embodiment, the method may also include the steps of mapping the service identity received in the location request to a service type utilizing a mapping function in the mobile location node; providing in the HLR/HSS, a list of approved service types associated with the mobile terminal; sending a mapped service type from the mobile location node to the HLR/HSS when requesting routing information; comparing in the HLR/HSS, the mapped service type with the list of approved service types; and accepting the location request if the mapped service type matches a service type from the list of approved service types.

DETAILED DESCRIPTION OF THE INVENTION

By definition, a privacy check is a comparison between information characterizing the LCS request and information related to the subscriber profile. Even if in most cases this comparison can be done in the HPLMN, in case of call-related and event-based LCS services, the handling of the call/event often has to be handled in the VPLMN where the user is currently located. This is seen as a further reason to keep privacy checks in the VPLMN, based on the SLPP received from the HPLMN, as in the existing architecture, due to the involvement of the VPLMN in the handling of the call/events. Alternative proposals aiming to keep all privacy checks in the HPLMN would require the VPLMN to contact the HPLMN by means of proposed new interfaces when the call/event occurs. In order to transfer the information, these interfaces would have to be updated each time that new events/information to be checked are defined.

When a subscriber roams to a VPLMN, the HPLMN is made aware of the LCS capabilities of the VMSC/SGSN by means of a "Supported LCS capabilities sets" mechanism. Thus, the HPLMN (HLR/HSS) is aware of the VMSC/SGSN capability to support enhanced privacy checks and can exercise full control in order to protect the privacy of subscribers roaming in a different PLMN. Thus, if the VPLMN does not support enhanced privacy checks, the HLR may reject the LCS request, without any involvement of the VPLMN and/or useless signaling.

The present invention utilizes an "Allowed Requestor List" or "codeword" to authorize LCS requests.

Figure 1:
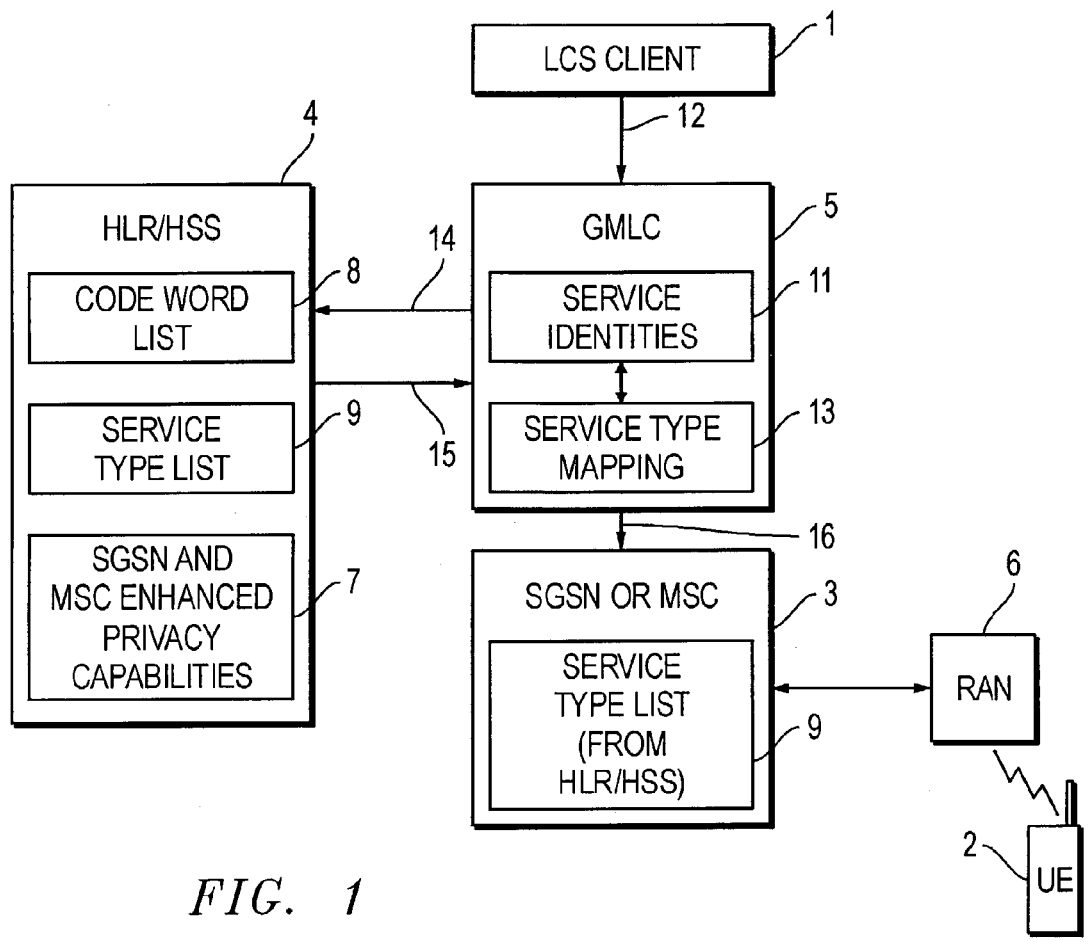
FIG. 1 is a simplified block diagram of the preferred embodiment of the system of the present invention illustrating the network nodes involved when an LCS Client requests the position of a roaming mobile terminal.

With the additional information described above included in the HLR, SGSN or MSC, and GLMC, a Location Request according to the present invention will now be described, with reference to the figures enclosed. Referring now to FIG. 1, an LCS Client 1 originates a Mobile Terminated Location Request (MT-LR) in order to obtain the position of a subscriber utilizing UE 2. The network also includes an SGSN or MSC 3, an HLR/HSS 4, a GMLC 5, and a Radio Access Network (RAN) 6. It is understood that both the SGSN and the MSC inform the HLR of their current LCS capabilities during a previous Update Location procedure. The SGSN and MSC then additionally inform the HLR about their supported enhanced privacy capabilities 7. The HLR can use this information later when a positioning is to be performed for a subscriber handled by this SGSN or MSC. According to the present invention, the HLR's capabilities are further extended by adding a list of codewords 8 and a list of service types 9 for each registered UE. A requesting LCS Client must provide a codeword matching one in the list of the UE of interest in order to have a location request accepted. The lists of service types are transmitted by the HLR to the SGSN and MSC, and only LCS Clients using a service type included in the list of service types for the UE of interest are accepted in the SGSN or MSC.

In accordance with the present invention, the GMLC 5 is also extended with new information. The new information is a list of service identities 11 for each LCS Client. This list is used to determine whether an LSC Client is allowed to perform a service type associated with a location request of the LCS Client. A requesting LCS Client must provide a service identity matching a service identity in the list in order to have a location request accepted. Consequently, an MT-LR proceeds as follows:

1) The LCS Client 1 transmits an LCS Request 12 to the GMLC 5. The LCS Request may carry the service identity and the codeword. The GMLC may verify that the service identity received in the LCS Request matches one of the service identities 11 allowed for the LCS Client. If the service identity does not match one of the service identities for the LCS Client, the GMLC may reject the LCS Request. Otherwise, the GMLC may utilize mapping function 13 to map the received service identity to a corresponding service type. If the codeword functionality is supported, the GMLC may reject the LCS Request whenever the LCS Client type is "value added" and the codeword was not received.

2) The GMLC 5 sends an interrogation message 14 to the HLR/HSS 4 for retrieval of routing information. The interrogation message includes the codeword if one was received from the LCS Client. For an LCS Client type different from "value added", an indication may be sent to the HLR/HSS in order to inform the HLR/HSS that the codeword is not applicable. The HLR/HSS determines whether the received codeword matches one of the codewords 8 stored for the target subscriber 2. If the codeword does not match, the HLR/HSS may return an error message to the GMLC. If no codeword is stored in the HLR/HSS for the target subscriber, the request is not rejected by HLR/HSS. If the HLR/HSS receives an indication from the GMLC that the codeword is not applicable, the codeword check is not performed in the HLR/HSS. If the HLR/HSS supports enhanced user privacy, the HLR/HSS determines whether the SGSN/MSC serving the target subscriber supports the enhanced user privacy mechanisms, by checking the supported LCS capabilities 6 previously sent to the HLR/HSS. If neither the SGSN nor the MSC node supports the enhanced user privacy, the HLR/HSS may send an error indication to the GMLC. If either one of the SGSN or MSC node supports the enhanced user privacy, the HLR/HSS sends only the routing address 15 of the node that supports the enhanced user privacy to the GMLC.

3) The GMLC 5 then forwards the LCS Request at 16 to the SGSN or MSC 3. The forwarded LCS Request carries the Service Type when one has been received from the LCS Client 1. The remainder of the MT-LR process is shown and described in connection with FIGS. 3A and 3B.

Figure 2:
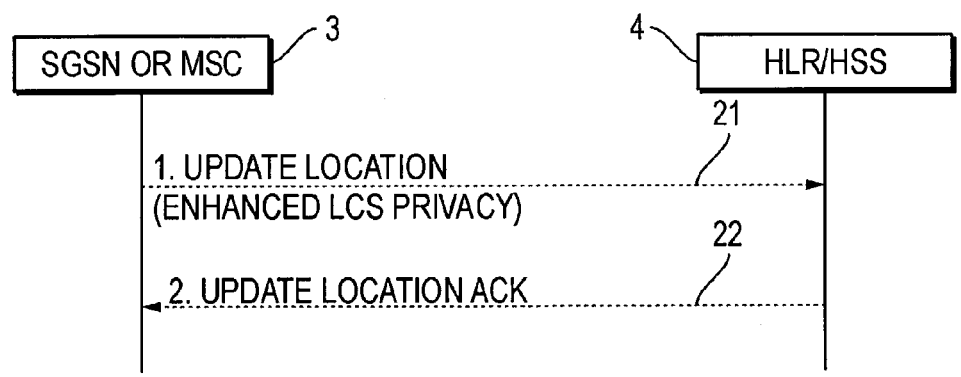
FIG. 2 is a signaling diagram illustrating the flow of messages in an Update Location procedure, in accordance with the method of the present invention.

FIG. 2 is a signaling diagram illustrating the flow of messages in an Update Location procedure, in accordance with the method of the present invention.

1) The SGSN or MSC 3 sends an Update Location message 21 to the HLR/HSS 4. Included is an indication of whether the SGSN or MSC supports enhanced LCS privacy.

2) The HLR/HSS 4 stores this information in database 7 and acknowledges the Update Location message by sending an Update Location Acknowledgment message 22 to the SGSN or MSC 3.

Figure 3A:
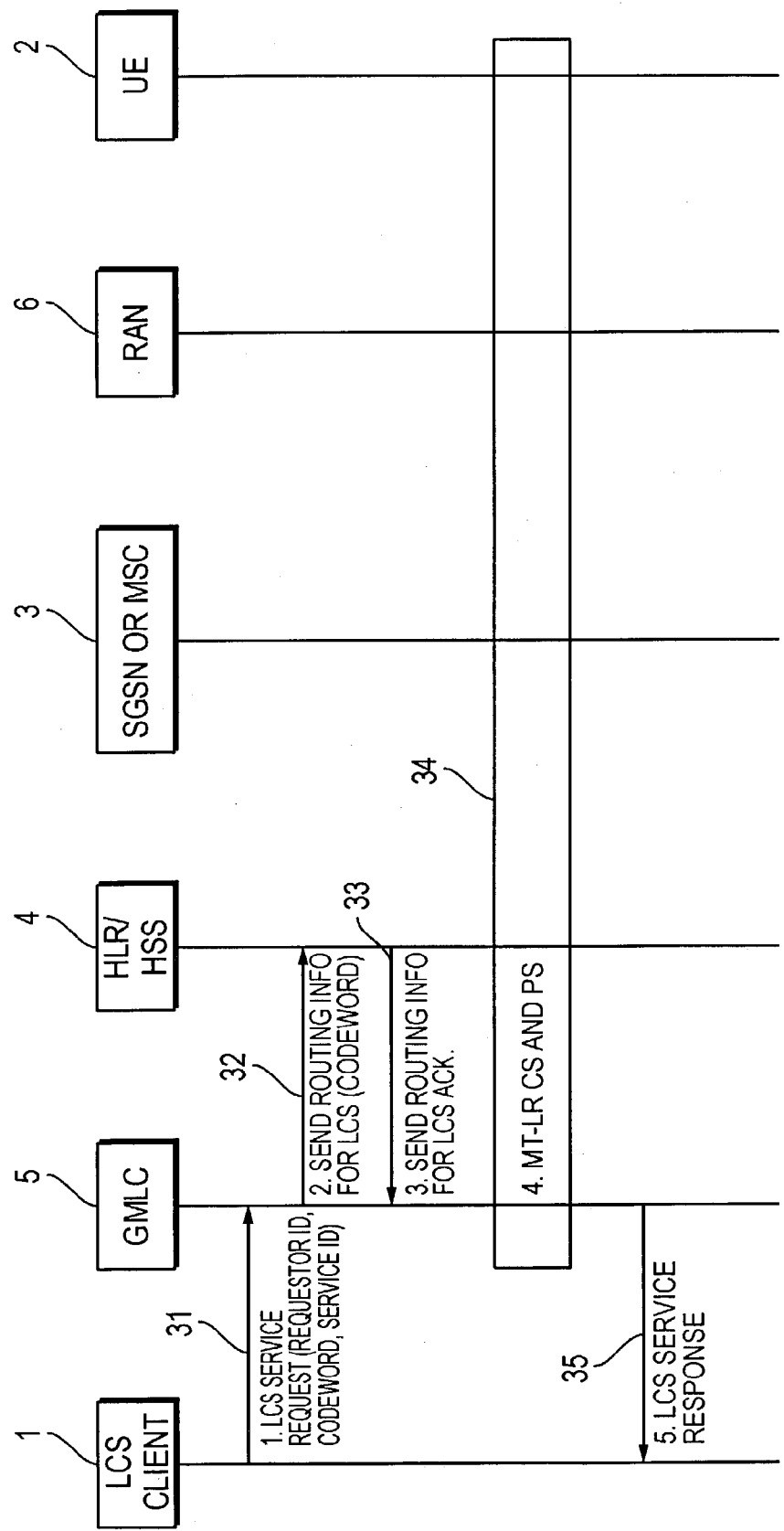
FIGS. 3A and 3B are portions of a signaling diagram illustrating the flow of messages in a Mobile Terminated Location Request (MT-LR) procedure, in accordance with the method of the present invention.
Figure 3B:
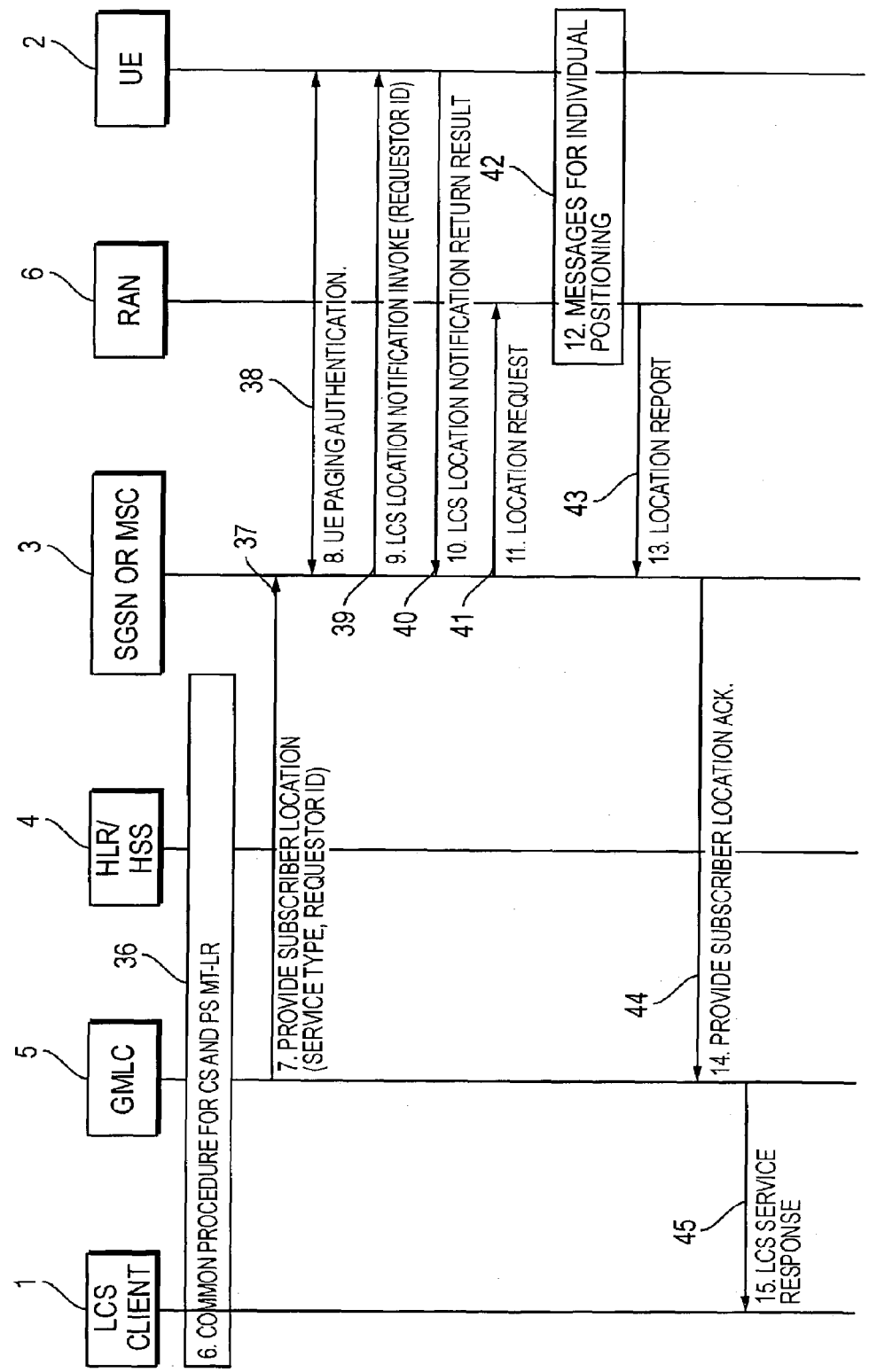

FIGS. 3A and 3B are portions of a signaling diagram illustrating the flow of messages in a Mobile Terminated Location Request (MT-LR) procedure, in accordance with the method of the present invention. Referring first to FIG. 3A:

1) An LCS Request 31 is sent from the LCS Client 1 to the GMLC 5 carrying the parameters for enhanced privacy checks (Requestor Id, codeword, and service identity).

2) The GMLC 5 verifies in the LCS client profile that the service identity received from the LCS Client matches one of the allowed service identities 11 for that LCS Client, and sends a $Send_{13}$ Routing_Info_for_LCS request message 32 to the HLR/HSS 4, carrying the codeword received from the LCS Client.

3) The HLR/HSS 4 then verifies that the codeword received from the GMLC 5 matches one of the codewords 8 stored for the target subscriber. If the codeword does not match, the HLR/HSS may send an error indication to the GMLC, and the LCS procedure is ended. If the codeword matches, the HLR/HSS may verify that the VMSC supports the enhanced user privacy mechanisms (this information is received in the HLR/HSS at location update in the "LCS supported capabilities set"). In order to protect the privacy of a roaming subscriber, the HLR/HSS may reject the Send_Routing_Info_for_LCS message if the VMSC/SGSN does not support enhanced privacy checks. If the codeword matches, and the VMSC/SGSN supports the needed LCS capabilities, the HLR/HSS then sends the routing information (i.e., the VMSC/SGSN address) to the GMLC in a Send_Routing_Info_for_LCS_ack message 33.

4) At 34, normal circuit-switched (CS) and/or packet-switched (PS) MT-LR procedures are carried out between the GMLC 5, the HLR/HSS 4, the SGSN or MSC 3, the RAN 6, and the UE 2.

5) The GMLC 5 then sends an LCS Service Response message 35 to the LCS Client 1.

6) At 36, common CS and/or PS MT-LR procedures are then carried out between the LCS Client 1, the GMLC 5, and the HLR/HSS 4.

7) The GMLC 5 converts the service identity received from the LCS Client 1 into the proper service type using mapping function 13, and sends the service type and the Requestor identity in a MAP Provide Subscriber Location message 37 to the SGSN or MSC 3. If the SLPP, which was previously received from the HLR/HSS, contains service types, an MT-LR/PS-MT-LR will be allowed by the SGSN or MSC/MSC server if the service type supplied by the GMLC matches the identity of any service type contained in the UE's SLPP. If the SLPP does not contain service types, the already existing privacy checks are performed.

8) The SGSN or MSC 3 then performs paging and authentication procedures 38 with the UE 2 through the RAN 6.

9) The SGSN or MSC 3 then sends an LCS Location Notification Invoke message 39 to the UE 2. If notification has to be performed, the LCS Location Notification Invoke message carries the Requestor ID.

10) The UE 2 returns an LCS Location Notification Return Result message 41 to the SGSN or MSC 3.

11) The SGSN or MSC 3 then sends a Location Request message 42 to the RAN 6.

12) Known messages for individual positioning are then exchanged between the RAN 6 and the UE 2.

13) A Location Report 43 containing the location information is then sent from the RAN 6 to the SGSN or MSC 3.

14) The SGSN or MSC 3 then sends a Provide Subscriber Location Acknowledgment message 44 to the GMLC 5 and includes the location information.

15) Finally, the GMLC 5 sends an LCS Service Response message 45 to the LCS Client 1 and includes the requested location information.

Utilizing the method of the present invention, the service requirements for enhanced privacy checks can thus be met without adding new network nodes/entities or new interfaces to the existing architecture.

What is claimed is:

1. A system in a mobile communication network for providing enhanced user privacy when responding to a location request from a client requesting location information for a mobile terminal, said network including a service node serving the mobile terminal and a home location register/home subscriber server (HLR/HSS) associated with the mobile terminal, wherein the location request includes an identifier for the requesting client) a codeword, and a service identity, said system comprising:
    a mobile location node that receives the location request from the client and forwards the location request to the HLR/HSS;
    a list of approved codewords associated with the mobile terminal, said list being stored in the HLR/HSS; and
    a list of approved service identities associated with the client;
    wherein, the location request is accepted only if the codeword included in the location request matches a codeword from the approved codeword list, and the service identity included in the location request matches a service identity from the approved service identity list;
    wherein the mobile location node includes a mapping function for mapping the service identity received in the location request to a service type, and wherein the service node includes a list of approved service types associated with the mobile terminal, and wherein the mobile location node sends a mapped service type to the service node for comparison with the list of approved service types, and wherein the mapped service type must also match a service type from the service time list in the service node for the location request to be accepted.

2. The system of claim 1, wherein the list of approved service identities associated with the client is located in the mobile location node.

3. The system of claim 1, wherein the HRL/HSS also includes a database of information relating to the capability of different serving nodes to provide enhanced user privacy utilizing the service type list, wherein the serving node informs the HLR/HSS of its capability to support use of the service type list.

4. The system of claim 3, wherein the serving node informs the HLR/HSS of its capability to support use of the service type list in an Update Location message transmitted to the HLR/HSS.

5. The system of claim 3, wherein the HLR/HSS sends the service type list to the service node upon being informed by the service node that the service node has the capability to support use of the service type list.

6. The system of claim 1, wherein the mobile communication network is a General Packet Radio Service (GPRS) network, the mobile location node is a Gateway Mobile Location Centre (GMLC), and the serving node is a Serving GPRS Support Node (SGSN) or a Mobile Switching Center (MSC).

7. A system in a mobile communication network for providing enhanced user privacy when responding to a location request from a client requesting location information for a mobile terminal, said network including a service node serving the mobile terminal and a home location register/home subscriber server (HLR/HSS) associated with the mobile terminal, wherein the location request includes an identifier for the requesting client, a codeword, and a service identity, said system comprising:
    a mobile location node that receives the location request from the client and forwards the location request to the HLR/HSS;
    a list of approved codewords associated with the mobile terminal, said list being stored in the HLR/HSS; and
    a list of approved service identities associated with the client;
    wherein, the location request is accepted only if the codeword included in the location request matches a codeword from the approved codeword list, and the service identity included in the location request matches a service identity from the approved service identity list;
    wherein the mobile location node includes a mapping function for mapping the service identity received in the location request to a service type, and the HLR/HSS includes a list of approved service types associated with the mobile terminal, and wherein the mobile location node sends a mapped service type to the HLR/HSS for comparison with the list of approved service types, and wherein the mapped service type must also match a service type from the service type list in the HLR/HSS for the location request to be accepted.

8. A method in a mobile communication network of providing enhanced user privacy when responding to a location request from a client requesting location information for a mobile terminal, said network including a mobile location node, a service node serving the mobile terminal, and a home location register/home subscriber server (HLR/HSS) associated with the mobile terminal, said method comprising the steps of:
    receiving by the mobile location node, the location request from the client, said location request including an identifier for the requesting client, a codeword, and a service identity;
    determining whether the codeword included in the location request is an approved codeword;

determining whether the service identity included in the location request is a service identity approved for the requesting client by performing the steps of:

mapping the service identity received in the location request to a service type utilizing a mapping function in the mobile location node;

providing in the service node, a list of approved service types associated with the mobile terminal;

sending a mapped service type from the mobile location node to the service node; and comparing in the service node, the mapped service type with the list of approved service types; and accepting the location request only if the codeword included in the location request is an approved codeword and the service identity included in the location request is a service identity approved for the requesting client.

9. The method of claim 8, further comprising providing in the HRL/HSS, a database of information relating to the capability of different serving nodes to provide enhanced user privacy utilizing the service type list, wherein the serving node informs the HLR/HSS of its capability to support use of the service type list.

10. The method of claim 9, wherein the serving node informs the HLR/HSS of its capability to support use of the service type list in an Update Location message transmitted to the HLR/HSS.

11. The method of claim 10, wherein the step of providing a list of approved service types in the service node includes sending the service type list from the HLR/HSS to the service node upon the HLR/HSS being informed by the service node that the service node has the capability to support use of the service type list.

12. The method of claim 8, wherein the mobile communication network is a General Packet Radio Service (GPRS) network, the mobile location node is a Gateway Mobile Location Centre (GMLC), and the serving node is a Serving GPRS Support Node (SGSN) or a Mobile Switching Center (MSC).

13. A method in a mobile communication network of providing enhanced user privacy when responding to a location request from a client requesting location information for a mobile terminal, said network including a mobile location node, a service node serving the mobile terminal, and a home location register/home subscriber server (HLR/HSS) associated with the mobile terminal, said method comprising the steps of:

receiving by the mobile location node, the location request from the client, said location request including an identifier for the requesting client, a codeword, and a service identity;

determining whether the codeword included in the location request is an approved codeword;

determining whether the service identity included in the location request is a service identity approved for the requesting client, wherein the mobile location node includes a list of approved service identities associated with the client, and the step of determining whether the service identity included in the location request is a service identity approved for the requesting client includes comparing the service identity included in the location request with the list of approved service; and accepting the location request only if the codeword included in the location request is an approved codeword and the service identity included in the location request is a service identity approved for the requesting client.

14. A method in a mobile communication network of providing enhanced user privacy when responding to a location request from a client requesting location information for a mobile terminal, said network including a mobile location node, a service node serving the mobile terminal, and a home location register/home subscriber server (HLR/HSS) associated with the mobile terminal, said method comprising the steps of:

receiving by the mobile location node, the location request from the client, said location request including an identifier for the requesting client, a codeword, and a service identity;

determining whether the codeword included in the location request is an approved codeword;

determining whether the service identity included in the location request is a service identity approved for the requesting client by performing the steps of:

mapping the service identity received in the location request to a service type utilizing a mapping function in the mobile location node;

providing in the HLR/HSS, a list of approved service types associated with the mobile terminal;

sending a mapped service type from the mobile location node to the HLR/HSS; and comparing in the HLR/HSS, the mapped service type with the list of approved service; and accepting the location request only if the codeword included in the location request is an approved codeword and the service identity included in the location request is a service identity approved for the requesting client.

* * * * *

UNITED STATES PATENT AND TRADEMARK OFFICE
CERTIFICATE OF CORRECTION

| | | |
|---|---|---|
| PATENT NO. | : 7,054,615 B2 | Page 1 of 1 |
| APPLICATION NO. | : 10/358417 | |
| DATED | : May 30, 2006 | |
| INVENTOR(S) | : Evensen et al. | |

It is certified that error appears in the above-identified patent and that said Letters Patent is hereby corrected as shown below:

In Column 6, Line 30, delete "$Send_{13}$ Routing_Info_for_LCS" and insert -- Send_Routing_Info_for_LCS --, therefor.

In Column 7, Line 39, in Claim 1, delete "client)" and insert -- client, --, therefor.

In Column 10, Line 11, in Claim 13, after "service" insert -- identities --.

In Column 10, Line 44, in Claim 14, after "service" insert -- types --.

Signed and Sealed this

Eighteenth Day of December, 2007

JON W. DUDAS
*Director of the United States Patent and Trademark Office*